United States Patent Office 3,775,474
Patented Nov. 27, 1973

3,775,474
PROCESS FOR THE PREPARATION OF
ACRYLIC ACID
Takashi Ohara, Nishinomiya, Michikazu Ninomiya, Kobe, Isao Yanagisawa, Ikeda, and Masahiro Wada, Nishinomiya, Japan, assignors to Nippon Shokubai Kagaku Kogyo Co., Ltd., Osaka, Japan
No Drawing. Filed Apr. 20, 1972, Ser. No. 245,758
Claims priority, application Japan, Apr. 27, 1971, 46/27,203
Int. Cl. C07c 51/26, 57/04
U.S. Cl. 260—530 N                     4 Claims

ABSTRACT OF THE DISCLOSURE

A process for the preparation of acrylic acid comprising catalytically oxidizing acrolein in the vapor phase with molecular oxygen in the presence of a catalytic oxide in which the atomic ratio of the constitutional metal elements is within the following range:

$$V_a Mo_b W_c Cr_d Cu_e$$

where $14 < a \leq 24$, $b = 12$, $4 \leq c < 20$, $1 \leq d < 10$ and $$0 \leq e < 12$$

---

This invention relates to a process for the preparation of acrylic acid by the catalytic vapor phase oxidation of acrolein.

In industrial processes of the catalytic vapor phase oxidation of unsaturated aldehydes to obtain the corresponding unsaturated carboxylic acids, it is generally very important to employ catalysts capable of giving high conversion of the starting unsaturated aldehydes and high selectivities for the intended unsaturated carboxylic acids. Further, it is also required that these catalysts can be prepared simply and easily and that they exhibit a high activity of excellent stability during long time use.

Molybdenum oxide-vanadium oxide series catalysts have heretofore been known as catalysts for use in the preparation of acrylic acid by the catalytic vapor phase oxidation of acrolein. Among the catalysts of this type, those comprising a major amount of vanadium oxide tend to allow the oxidation to proceed completely. Therefore, when such catalysts are used for the oxidation of acrolein, the amounts of carbon dioxide gas and water formed increase and the selectivity to acrylic acid is considerably lowered. For this reason, each of the industrially applicable catalysts of this type comprises a major amount of molybdenum oxide. For instance, the specification of Japanese patent application publication No. 1,775/66 discloses that a catalyst in which the weight ratio of molybdenum oxide:vanadium oxide is within the range of from 2:1 to 8:1 is effective for preparing acrylic acid from acrolein. Also U.S. Pat. No. 3,567,773 teaches that a catalyst comprising 1–6 vanadium atoms per 12 molybdenum atoms is effective for the preparation of acrylic acid by the oxidation of acrolein.

An object of this invention is to provide a process for the catalytic vapor phase oxidation of acrolein which can be practised industrially advantageously by developing a novel catalyst which can be conveniently used in the high space velocity reaction and can give acrylic acid of high purity in high yield.

Other objects of this invention will be apparent from the description given hereinbelow.

As a result of research it has now been found that a catalytic oxide comprising as constitutional elements vanadium, molybdenum, tungsten and chromium (and copper) in which the amount of vanadium is, contrary to known catalysts, greater than the amount of molybdenum, can attain the above-mentioned object of this invention.

The catalytic oxide of this invention is characterized in that the metal constituents of the oxide are present at the following specific atomic ratio:

$$V_a Mo_b W_c Cr_d Cu_e$$

where $14 < a \leq 24$, $b = 12$, $4 \leq c < 20$, $1 \leq d < 10$ and $$0 \leq e < 12$$

It is unnecessary for oxygen to be present in the special reduced state in the catalytic oxide. It is assumed that the oxygen is present in the catalytic oxide in the form of a complicated metal oxide or metallic acid salt. Therefore, the amount of oxygen contained in the catalytic oxide varies depending on the atomic ratio of the metal elements constituting the catalytic oxide.

In this invention, the catalytic oxide may be used for the reaction in the form supported on a suitable inactive carrier, if necessary. As such inactive carrier inactive porous substances in either naturally occurring forms may be employed or preformed granular forms. Examples of such inactive porous substances are alpha-alumina, silicon carbide, pumice, silica, zirconia, magnesium silicate, titanium oxide and mixtures thereof. In this invention, it is desirable to employ an inactive porous carrier having a specific surface area of less than 2 m.²/g. and a porosity of 10–65% in which at least 90% of pores have a macropore diameter of 20 to 1500 microns.

The catalyst to be used in this invention may be prepared, for instance, by adding an aqueous solution of ammonium dichromate (and an aqueous solution of copper nitrate) to an aqueous solution containing ammonium molybdate, ammonium paratungstate and ammonium metavanadate, throwing a desired carrier into the resulting aqueous mixture, heating and evaporating the mixture to dryness to deposit the above metal compounds on the carrier, otherwise molding the solid into a desired form, for instance, into tablets, if necessary, and thereafter calcining the same at a temperature of 350 to 600° C. Of course, the use of the carrier may be omitted in the above method. Further, not only the above-mentioned ammonium salts and nitrates but also compounds capable of being formed into the intended catalytic oxide under calcination conditions, such as hydroxides and carbonates, may be used as starting compounds for the preparation of the catalyst in this invention.

The catalytic vapor phase oxidation process according to this invention can be accomplished by introducing a gaseous mixture comprising 1–10% by volume of acrolein, 3–15% by volume of molecular oxygen and 10–60% by volume of steam, the balance being gases not substantially pertaining to the reaction, onto a catalyst prepared in such manner as described above, at a temperature of 200 to 350° C. under a pressure ranging from atmospheric pressure to 10 atmospheres. During the oxidation, the space velocity is maintained at a level of 2000 to 8000 hr.⁻¹. The reaction may be carried out either in a fixed bed or in a fluidized bed.

A gas obtained by the catalytical vapor phase oxidation of propylene in the presence of a catalyst, or a gas formed by replenishing air or oxygen in such gas from the oxidation of propylene may be used as the above-mentioned gaseous mixture. The above product gas from the oxidation of propylene usually comprises acrylic acid, unreacted propylene, propane, acetaldehyde, acetic acid and the like in addition to oxygen, nitrogen, steam and acrolein. As is illustrated in Example 9 given hereinbelow, however, such product gas may be used in this invention without any disadvantage.

As is shown in the examples given hereinbelow, in this invention the catalyst activity can be maintained stable at a high level for a long period of time and the one-pass yield of acrylic acid can be maintained at a high level without reduction of the space velocity.

Although not wishing to be limited by theoretical principles, it is assumed that the reason for the above mentioned effects is probably due to the fact that complicated oxides or acid salts . . . of tungsten and chromium (and copper) are combined with those of V-Mo series to thereby adjust the catalyst efficiency and that when a carrier is used, the catalyst efficiency is further controlled by the porosity of the carrier.

This invention will now be explained more specifically by reference to examples and comparative examples.

The conversion, selectivity and one-pass yield used in the instant specification are as defined below:

Conversion (percent)
$$= \frac{\text{number of moles of reacted acrolein}}{\text{number of moles of fed acrolein}} \times 100$$

Selectivity (percent)
$$= \frac{\text{number of moles of formed acrylic acid}}{\text{number of moles of reacted acrolein}} \times 100$$

One-pass yield (percent)
$$= \frac{\text{number of moles of formed acrylic acid}}{\text{number of moles of fed acrolein}} \times 100$$

EXAMPLE 1

While 5000 ml. of water were being heated with stirring, successively 293 g. of ammonium paratungstate, 280 g. of ammonium metavandate, 338 g. of ammonium molybdate and 40 g. of ammonium dichromate were added into water. Separately, 200 g. of copper nitrate were dissolved in 500 ml. of water. Both aqueous solutions were mixed. The aqueous mixture and 1000 ml. of granular alpha-alumina having a diameter of 3-5 mm. which had a specific surface area of less than 1 m.²/g. and a porosity of 25% and in which 92% of the pores had a macropore diameter of 30-250 microns were put into a porcelain evaporating dish, and they were evaporated to dryness on a hot water bath. The resulting solid was calcined at 400° C. for 5 hours.

As a result a catalyst consisting of an alpha-alumina carrier and, supported thereon, a catalytic oxide of the metal composition, $V_{15}Mo_{12}W_{6.8}Cr_{2.0}Cu_{5.2}$ was obtained.

The so prepared catalyst (1000 ml.) was packed in a U-shaped stainless steel tube having a diameter of 25 mm., and the tube was immersed in a molten nitrate bath heated at 265° C. A gaseous mixture comprising 6% by volume of acrolein, 54% by volume of air and 40% by volume of steam was introduced into the tube, and the space velocity of the gaseous mixture was maintained at 3600 hr.$^{-1}$.

Results of the reaction are shown in Table 1. When the reaction was continued for 720 hours (one month) under the same reaction conditions, the one-pass yield was maintained at a high level, i.e. 90.5%.

COMPARATIVE EXAMPLE 1

A catalyst consisting of an alpha-alumina carrier and, supported thereon, a catalytic oxide having the metal element composition, $V_{15}Mo_{12}Cu_{2.5}$, was prepared by repeating the procedure of Example 1 without employing amonium paratungstate and ammounium dichromate.

The oxidation of acrolein was carried out under the same conditions as in Example 1 with use of the so prepared catalyst. Results are shown in Table 1.

COMPARATIVE EXAMPLE 2

A catalyst consisting of an alpha-alumina carrier and, supported thereon, a catalytic oxide having the metal element composition, $V_{15}Mo_{12}W_{6.8}Cu_{5.2}$, was prepared by repeating the procedure of Example 1 without employing ammonium dichromate.

The oxidation of acrolein was carried out under the same conditions as in Example 1. Results are shown in Table 1.

COMPARATIVE EXAMPLE 3

A catalyst was prepared by repeating the procedure of Example 1 without employing ammonium paratungstate, ammonium dichromate and copper nitrate.

The reaction was carried out under the same conditions as in Example 1 with use of the so prepared catalyst. Results are shown in Table 1.

TABLE 1

| | Catalyst composition (atomic ratio) | | | | | Reaction temperature (° C.) | Space velocity (hr.$^{-1}$) | Acrolein conversion (percent) | Selectivity to acrylic acid (percent) | One-pass yield of acrylic acid (percent) |
|---|---|---|---|---|---|---|---|---|---|---|
| | V | Mo | W | Cr | Cu | | | | | |
| Example 1 | 15 | 12 | 6.8 | 2.0 | 5.2 | 265 | 3,600 | 97.0 | 93.0 | 90.2 |
| Comparative Example: | | | | | | | | | | |
| 1 | 15 | 12 | 0 | 0 | 5.2 | 265 | 3,600 | 61.0 | 75.2 | 45.9 |
| 2 | 15 | 12 | 6.8 | 0 | 5.2 | 265 | 3,600 | 47.0 | 82.1 | 38.6 |
| 3 | 15 | 12 | 0 | 0 | 0 | 265 | 3,600 | 58.0 | 53.0 | 30.8 |

EXAMPLES 2-7

Example 1 was repeated by varying the atomic ratio of the metal elements in the catalytic oxide and the reaction conditions as indicated in Table 2. Results are shown in Table 2.

TABLE 2

| | Catalyst composition (atomic ratio) | | | | | Reaction temperature (° C.) | Space velocity (hr.$^{-1}$) | Acrolein conversion (percent) | Selectivity to acrylic acid (percent) | One-pass yield of acrylic acid (percent) |
|---|---|---|---|---|---|---|---|---|---|---|
| | V | Mo | W | Cr | Cu | | | | | |
| Example: | | | | | | | | | | |
| 2 | 16 | 12 | 6.8 | 2.0 | 5.2 | 265 | 3,600 | 97.3 | 92.5 | 90.0 |
| | | | | | | 280 | 5,000 | 95.0 | 94.1 | 89.4 |
| 3 | 16 | 12 | 8.0 | 3.0 | 5.2 | 280 | 3,600 | 94.0 | 94.0 | 88.4 |
| 4 | 18 | 12 | 6.8 | 2.0 | 7.0 | 245 | 3,600 | 97.5 | 92.0 | 89.7 |
| 5 | 18 | 12 | 5.0 | 4.0 | 5.2 | 250 | 3,600 | 96.0 | 90.0 | 86.4 |
| | | | | | | 275 | 5,000 | 94.8 | 93.7 | 88.8 |
| 6 | 20 | 12 | 6.8 | 7.0 | 5.2 | 275 | 3,600 | 96.5 | 90.5 | 87.4 |
| 7 | 18 | 12 | 6.8 | 2.0 | 0 | 285 | 3,600 | 96.5 | 90.5 | 87.4 |

EXAMPLE 8

The reaction was carried out under the same conditions as in Example 1 except that silicon carbide of a diameter of 3-5 mm. which had a surface area of less than 1 m.²/g. and a porosity of 21% and in which 95% of pores had a macropor diameter of 30-500 microns was used as the carrier.

As a result, acrylic acid was formed at an acrolein conversion of 97.2%, a selectivity to acrylic acid of 92.8% and an acrylic acid one-pass yield of 90.2%.

EXAMPLE 9

A gaseous mixture obtained by catalytically oxidizing in the vapor phase propylene for industrial use (having a purity of more than 94%) in the presence of a catalyst of the Mo-Bi series was introduced into a reaction tube packed with the same catalyst as prepared and used in Example 1, and the reaction was carried out at a temperature of 260° C. and a space velocity of 3600 hr.⁻¹. The above-mentioned starting gaseous mixture had the following composition:

|  | Percent by volume |
|---|---|
| Acrolein | 5.01 |
| Propylene plus propane | 0.58 |
| Acrylic acid plus acetic acid | 0.60 |
| Nitrogen | 51.0 |
| Oxygen | 6.50 |
| Steam | 34.0 |
| Others | 2.31 |

When the calculation was conducted based on the assumption that propylene, propane, acrylic acid, acetic acid and the like in the above gaseous mixture were not reacted, acrylic acid was formed by the above reaction at an acrolein conversion of 97.5%, a selectivity to acrylic acid of 92.8% and an acrylic acid one-pass yield of 90.5%.

What we claim is:

1. A process for the preparation of acrylic acid comprising catalytically oxidizing in the vapor phase acrolein with molecular oxygen in the presence of a catalytic oxide consisting essentially of the following metal elements within the atomic ratio range of:

$$V_a Mo_b W_c Cr_d Cu_e$$

wherein $14 < a \leq 24$, $b = 12$, $4 \leq c < 20$, $1 \leq d < 10$ and $0 \leq e < 12$.

2. A process for the preparation of acrylic acid comprising catalytically oxidizing in the vapor phase-acrolein with molecular oxygen at a temperature of 200 to 350° C. under a pressure ranging from atmospheric pressure to 10 atmospheres at a space velocity of 2,000 to 8,000 hr.⁻¹ in the presence of a catalytic oxide consisting essentially of the following metal elements within the atomic ratio range of:

$$V_a Mo_b W_c Cr_d Cu_e$$

wherein $14 < a \leq 24$, $b = 12$, $4 \leq c < 20$, $1 \leq d < 10$ and $0 \leq e < 12$.

3. A process for the preparation of acrylic acid comprising catalytically oxidizing in the vapor phase acrolein with molecular oxygen in the presence of a catalyst consisting essentially of inactive carrier and, supported thereon, a catalytic oxide consisting essentially of the following metal elements within the atomic ratio range of:

$$V_a Mo_b W_c Cr_d Cu_e$$

wherein $14 < a \leq 24$, $b = 12$, $4 \leq c < 20$, $1 \leq d < 10$ and $0 \leq e < 12$.

said inactive carrier having a specific surface area of less than 2 m.²/g. and a porosity of 10–65% and at least 90% of pores of the carrier having a macropore diameter of 20 to 1,5000 microns.

4. A process for the preparation of acrylic acid comprising catalytically oxidizing in the vapor phase acrolein with molecular oxygen at a temperature of 200 to 350° C. under a pressure ranging from atomspheric pressure to 10 atmospheres at a space velocity of 2,000 to 8,000 hr.⁻¹ in the presence of a catalyst consisting essentially of an inactive carrier and, supported thereon, a catalytic oxide consisting essentially of the following metal elements within the atomic ratio range of:

$$V_a Mo_b W_c Cr_d Cu_e$$

wherein $14 < a \leq 24$, $b = 12$, $4 \leq c < 20$, $1 \leq d < 10$ and $0 \leq e < 12$.

said inactive carrier having a specific surface area of less than 2 m.²/g. and a porosity of 10–65% and at least 90% of pores of the carrier having a macropore diameter of 20 to 1,500 microns.

References Cited

FOREIGN PATENTS

| 1,084,143 | 9/1967 | Great Britain | 260—530 N |
| 1,086,523 | 10/1967 | Great Britain | 260—530 N |
| 746,202 | 8/1970 | Belgium | 260—530 N |

JAMES A. PATTEN, Primary Examiner

R. D. KELLY, Assistant Examiner

U.S. Cl. X.R.

252—467, 465, 469, 456

UNITED STATES PATENT OFFICE
CERTIFICATE OF CORRECTION

Patent No. 3,775,474  Dated November 27, 1973

Inventor(s) Takashi OHARA ET AL

It is certified that error appears in the above-identified patent and that said Letters Patent are hereby corrected as shown below:

Column 6, line 15: cancel "1,5000" and substitute therefor --1,500--

Column 4, line 10: cancel "$V_{15}Mo_{12}Cu_{2.5}$," and substitute therefor --$V_{15}Mo_{12}Cu_{5.2}$,--

Column 4, line 12: cancel "amonium" and "ammounium" and substitute therefor in both instances --ammonium--

Signed and sealed this 9th day of April 1974.

(SEAL)
Attest:

EDWARD M. FLETCHER, JR.
Attesting Officer

C. MARSHALL DANN
Commissioner of Patents